United States Patent [19]

Tatara et al.

[11] Patent Number: 4,831,409
[45] Date of Patent: May 16, 1989

[54] COLOR IMAGE PROCESSING SYSTEM HAVING AN ADJUSTABLE UCR FUNCTION

[75] Inventors: Yoshikuni Tatara; Daisuke Yamada, both of Yokohama, Japan

[73] Assignee: Ricoh Company, Ltd., Tokyo, Japan

[21] Appl. No.: 143,505

[22] Filed: Jan. 12, 1988

[30] Foreign Application Priority Data

Jan. 13, 1987 [JP] Japan ................................ 62-4044

[51] Int. Cl.$^4$ ...................... G03G 15/00; G03G 15/01
[52] U.S. Cl. ..................................... 364/526; 346/157; 358/300
[58] Field of Search ............... 355/4, 14 R, 14 C, 3 R

[56] References Cited

U.S. PATENT DOCUMENTS

| | | | |
|---|---|---|---|
| 4,690,541 | 9/1987 | Sakai et al. | 355/4 |
| 4,720,750 | 1/1988 | Watanabe | 355/4 X |
| 4,780,744 | 10/1988 | Porter et al. | 355/4 |

Primary Examiner—A. C. Prescott

[57] ABSTRACT

A color image processing system having an under color removal (UCR) function is provided. A mode set switch is preferably provided to set the UCR function to be operative or inoperative selectively. An UCR rate setting unit is preferably provided so as to varyingly set the UCR to be applied to color image data. Data of four color components, including cyan, magenta, yellow and black, are processed. In the preferred embodiment, the three color components other than black are processed and printed first, and, then, a black component image is printed at the end.

12 Claims, 16 Drawing Sheets

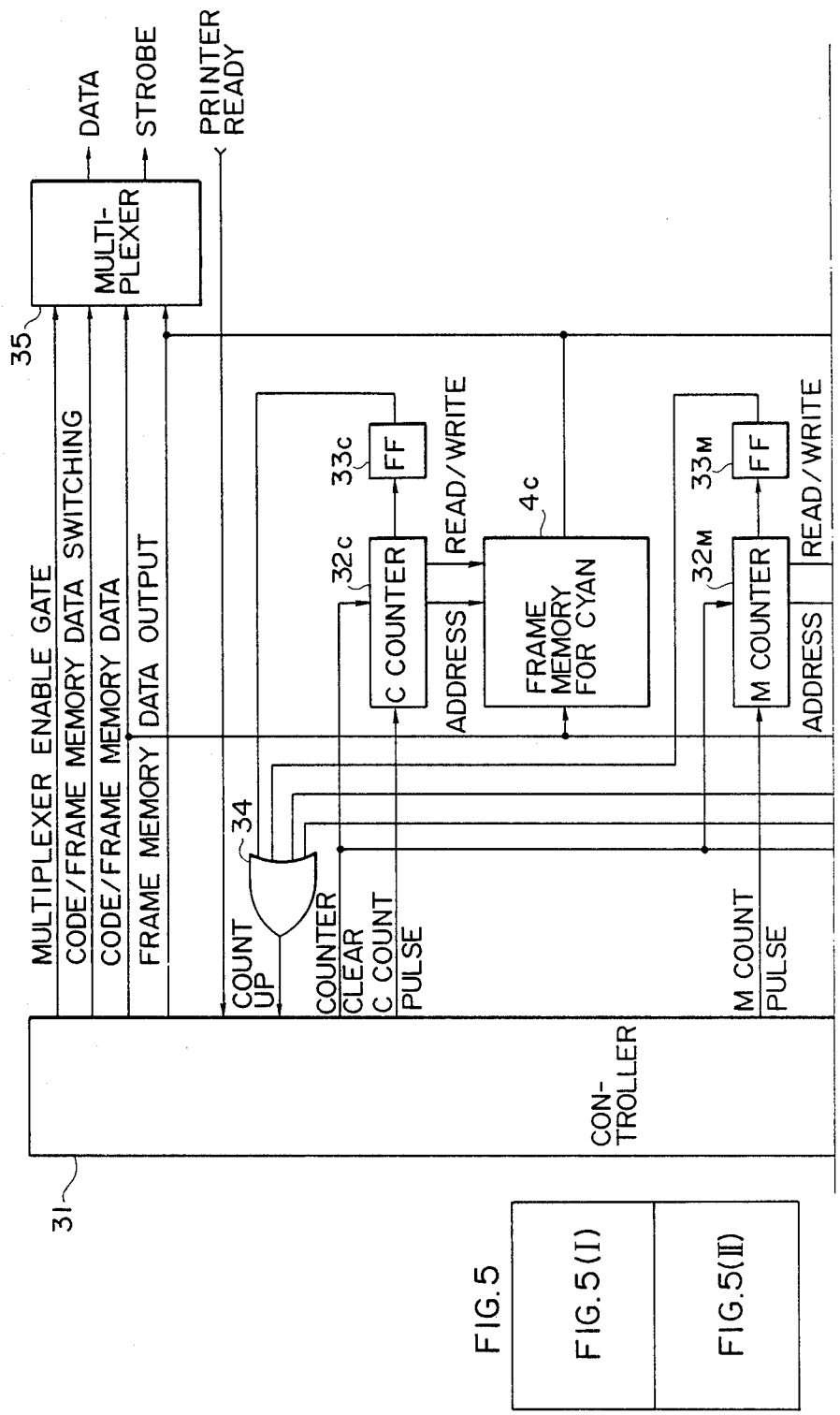

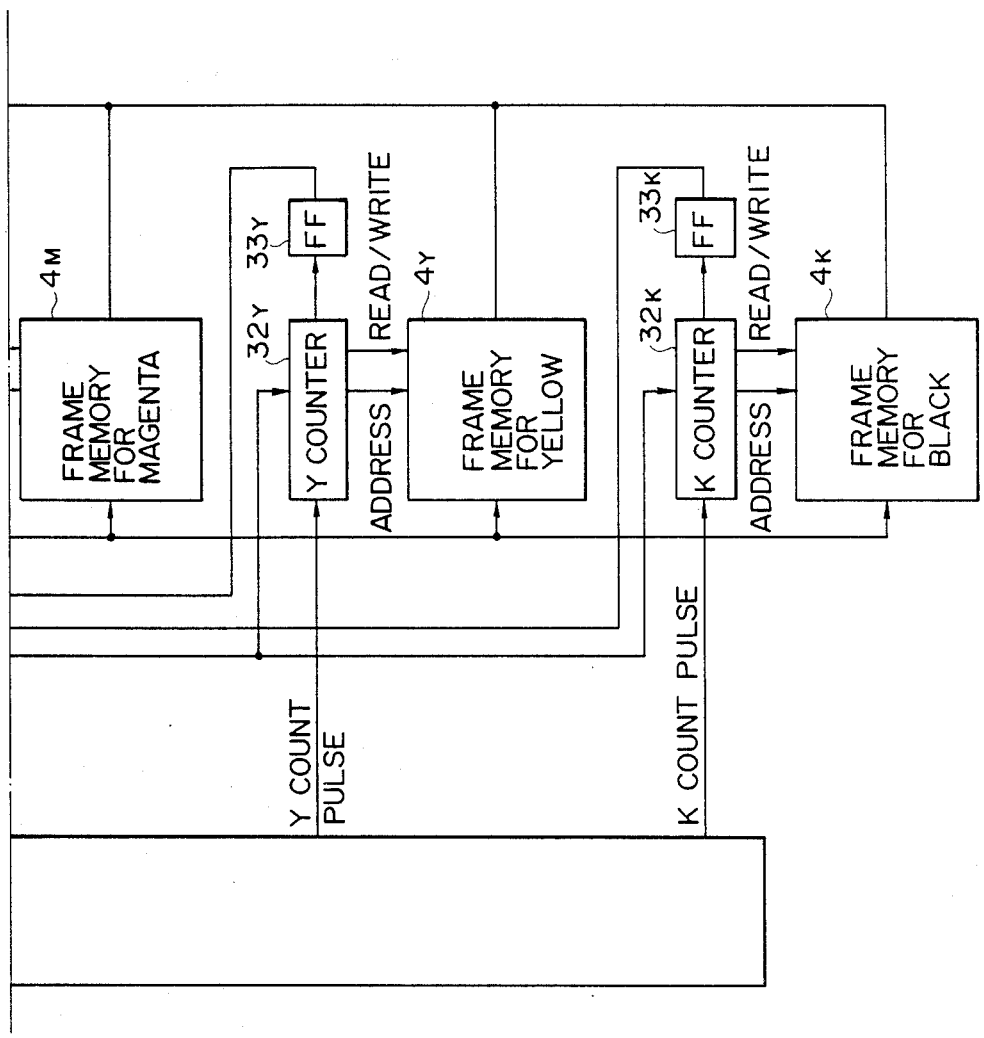
FIG. 5 (II)

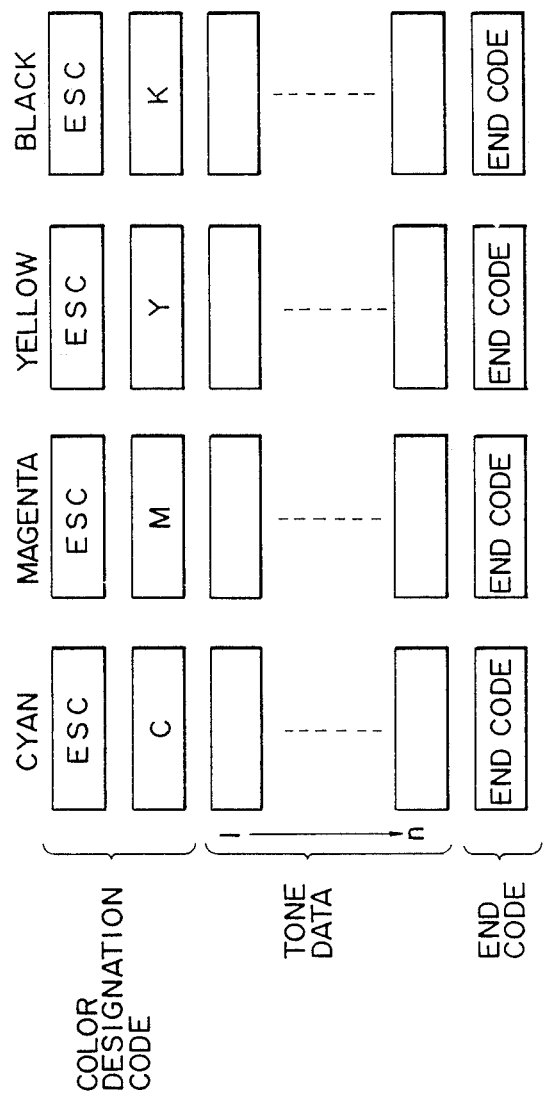

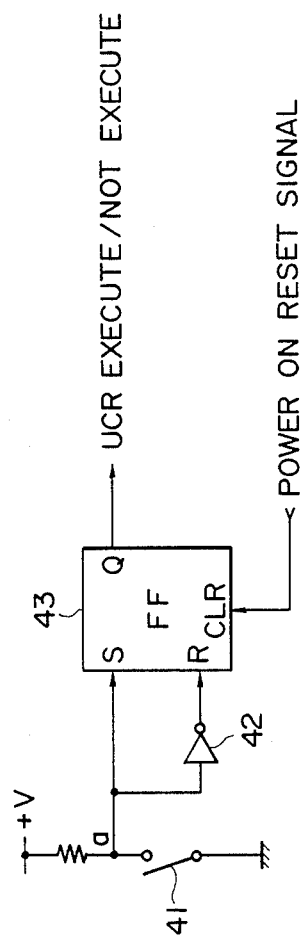
F I G. 8
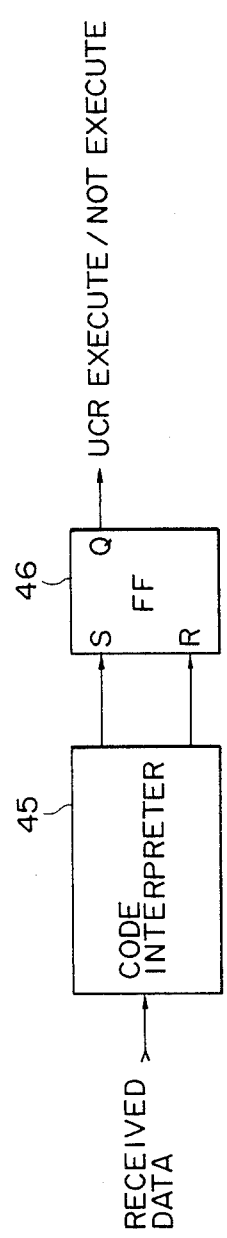
F I G. 9

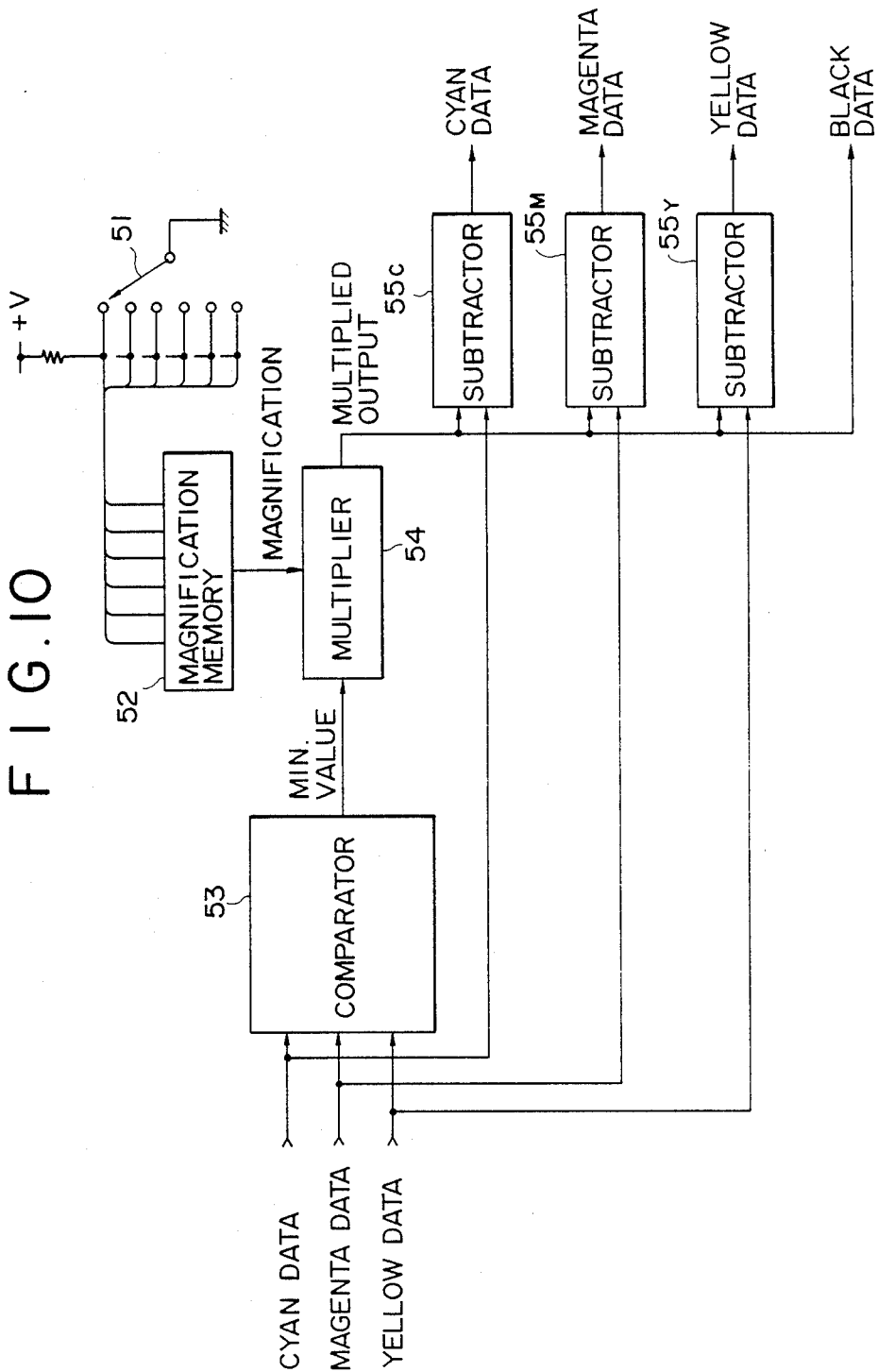
F I G. 10

F I G. 12
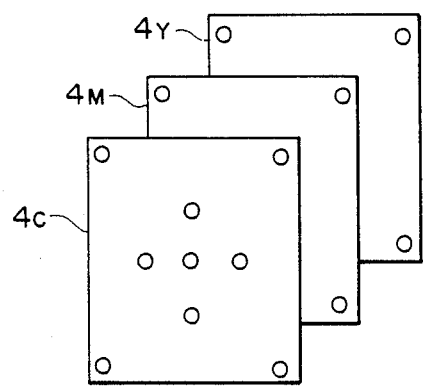
F I G. 13
| VALUE OF "A" | MAGNIFI-CATION (%) |
|---|---|
| 200 ~ | 80 |
| 150 ~ | 78 |
| 120 ~ | 70 |
| 110 ~ | 68 |
| 90 ~ | 62 |
| ~ 90 | 60 |

F I G. 14
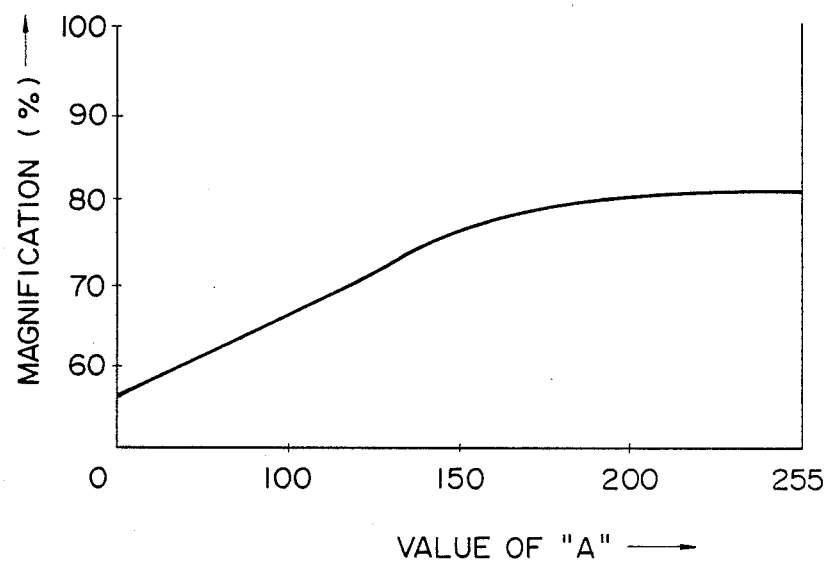

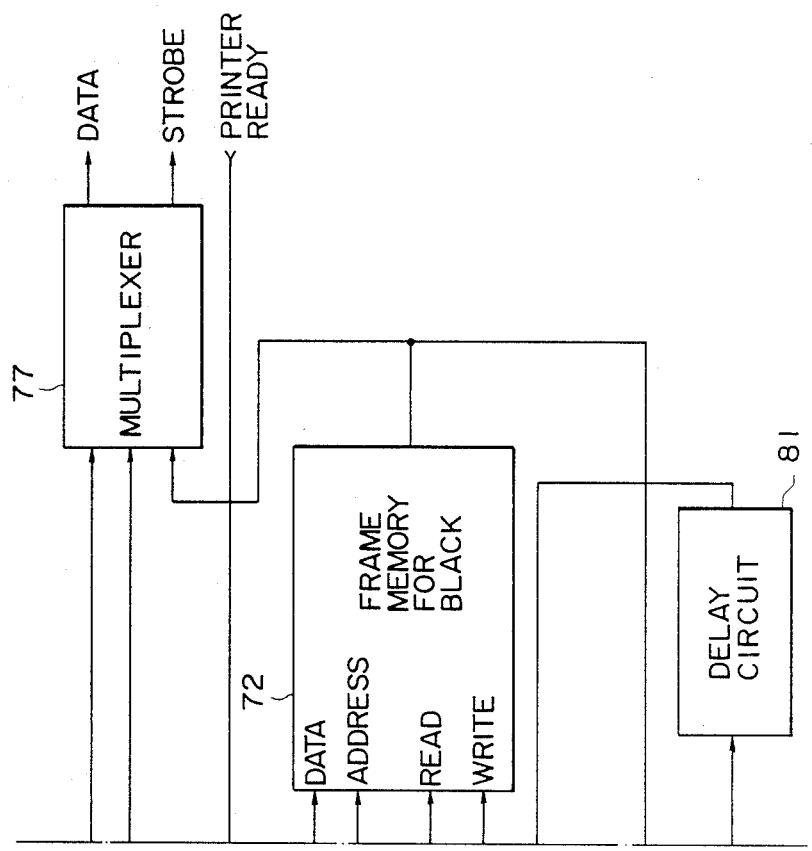

COLOR IMAGE PROCESSING SYSTEM HAVING AN ADJUSTABLE UCR FUNCTION

BACKGROUND OF THE INVENTION

1. Field of the Invention

This invention generally relates to a color image processing system for processing color image data to be used in forming a color image, and, in particular, to a color image processing system having an adjustable under color removal (UCR) function suitable for use in color copiers and color printers.

2. Description of the Prior Art

In various imaging apparatuses, including copier and printers using an electrophotographic process, such as laser beam printers, thermal printers and ink-jet printers, it is often desired to produce a color image. Here, such an imaging apparatus capable of producing a color image will be referred to as a color printer. In a color printer, a color image may be formed by using three coloring materials, i.e., cyan, magenta and yellow; however, use is often made of black in addition to these three coloring materials. In such a color printer using four coloring materials, i.e., cyan, magenta, yellow and black, the image data for black color component is created by applying an under color removal (UCR) process based on the image data for each of cyan, magenta and yellow in order to print the black color component.

In the prior art UCR process, the black component is printed first and then the three color components of cyan, magenta and yellow are printed as superimposed on the black color component. For this reason, in accordance with the prior art UCR process, the image data of each of cyan, magenta and yellow is once stored in a frame memory of the corresponding color component, and, then, the image data is read out of each of the frame memories to find the minimum value for the same pixel, if it is an UCR process having a 100% UCR rate. And, then, the minimum value thus found is subtracted from each of the corresponding image data read out of cyan, magenta and yellow frame memories to produce a modified image data which is then stored into a corresponding frame memory as a print data. On the other hand, the thus found minimum value is stored into a frame memory for black color component as a print data for printing a black pixel. In this manner, print data for black color is obtained for the entire page and then the black print data is used to print black color component first. And, then, the remaining color components of cyan, magenta and yellow are printed one after another to produce a color image using four coloring materials. In this manner, in accordance with the prior art UCR process, since black print data must be created so as to print a black color component, the UCR process is slow, which tends to slow down the overall imaging speed.

SUMMARY OF THE INVENTION

In accordance with one aspect of the present invention, there is provided a color image processing system for processing image data for producing a color image using four coloring materials, in which a black color component image is printed after printing the other three color component images. That is, in accordance with this aspect of the present invention, three color component images are printed one after another using three coloring materials, e.g., cyan, magenta, and yellow, and then a black color component image is printed using a black coloring material. With this structure, it is only necessary to provide a single frame memory, so that the color imaging apparatus can be simplied in structure and lowered in cost.

In accordance with another aspect of the present invention, there is provided a color image processing system having an adjustable UCR function, in which the UCR function may be set operative or inoperative switchingly. In the preferred embodiment, switching means is provided to set the UCR function operative or inoperative. Such switching means may be manually operable or automatically operable. In addition, the UCR function may be set at a desired UCR rate manually or automatically in accordance with a desired touch of a resulting color image.

It is therefore a primary object of the present invention to obviate the disadvantages of the prior art and to provide an improved color image processing system.

Another object of the present invention is to provide a color image processing system having an improved UCR function.

A further object of the present invention is to provide an improved color image processing system fast in operation and high in performance.

A still further object of the present invention is to provide a color image processing system having a high-speed UCR function.

A still further object of the present invention is to provide an improved color image processing system simple in structure and thus low at cost.

Other objects, advantages and novel features of the present invention will become apparent from the following detailed description of the invention when considered in conjunction with the accompanying drawings.

BRIEF DESCRIPTION OF THE DRAWINGS

FIG. 5 is an illustration showing how to combine FIGS. 5(I) and 5(II);

FIGS. 5(I) and 5(II), when combined as shown in FIG. 5, show mostly in block form a color image processing system constructed in accordance with one embodiment of the present invention, in which an UCR process is set operative or inoperative selectively;

FIGS. 6 and 7 are illustrations which are useful for explaining the operation of the system shown in FIGS. 5(I) and 5(II);

FIGS. 8 and 9 are schematic illustrations showing examples of means for selectively setting an UCR function operative or inoperative, which may be advantageously incorporated into the system shown in FIGS. 5(I) and 5(II);

FIG. 10 is a schematic illustration showing mostly in block form a color image processing system constructed in accordance with another embodiment of the present invention, in which an UCR rate may be set at a desired level;

FIGS. 11(I) and 11(II), when combined as shown in FIG. 11, show in block form a color image processing system constructed in accordance with a further embodiment of the present invention, in which an UCR rate may be set automatically at a desired level;

FIGS. 12 through 14 are illustrations which are useful for understanding the operation of the system shown in FIGS. 11(I) and 11(II);

FIGS. 15(I) and 15(II), when combined as shown in FIG. 15, show in block form a color image processing system constructed in accordance with a still further embodiment of the present invention.

DESCRIPTION OF THE PREFERRED EMBODIMENTS

Figure 1:
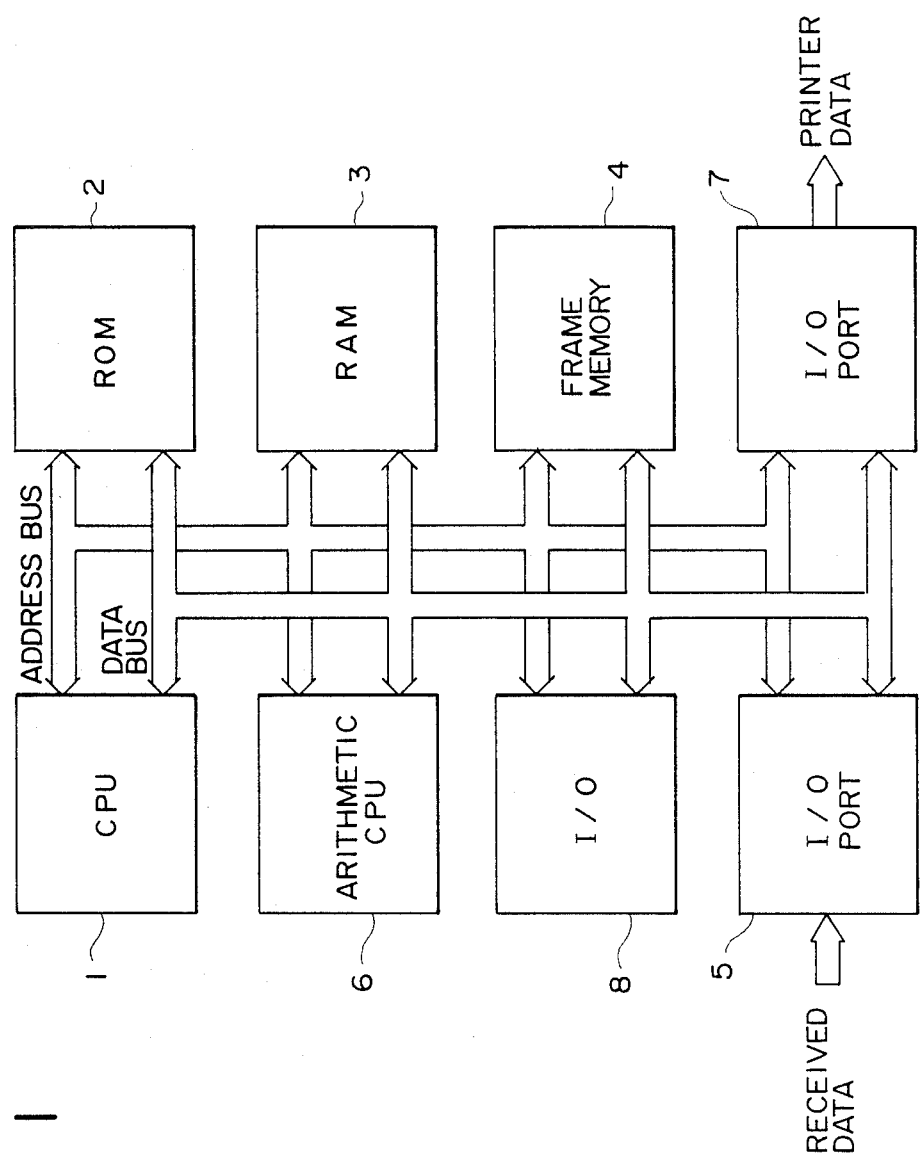
FIG. 1 is a block diagram showing the overall structure of a color image processing system to which the present invention may be advantageously applied.

Referring now to FIG. 1, there is shown in block form the overall structure of an image process controlling system of a color printer, to which the present invention may be advantageously applied. As shown, the illustrated system includes a central processing unit (CPU) 1 in charge of the overall control of the present image processing control system, a read only memory (ROM) 2 for storing fixed information, such as programs, and a random access memory (RAM) which serves as a working area for CPU 1 or the like. Also provided is a frame memory 4 for storing received image data which has been received through an I/O port 5 as transmitted from a host system. An arithmetic CPU 6 is provided for taking the data stored in the frame memory 4, applying various processes, such as various filtering processes like edge enhancement or smoothing, size enlargement and reduction processes, image rotation process, under color removal (UCR) process and dither process (binary conversion process) to the data thus taken from the frame memory 4, and, then, returning the thus processed data back to the frame memory 4. The data stored in the frame memory 4 in this manner is then supplied to a printer engine or image forming unit through an I/O port 7. Also provided is an I/O 8 which serves as an input/output interface provided with various switches and display units.

Figure 2:
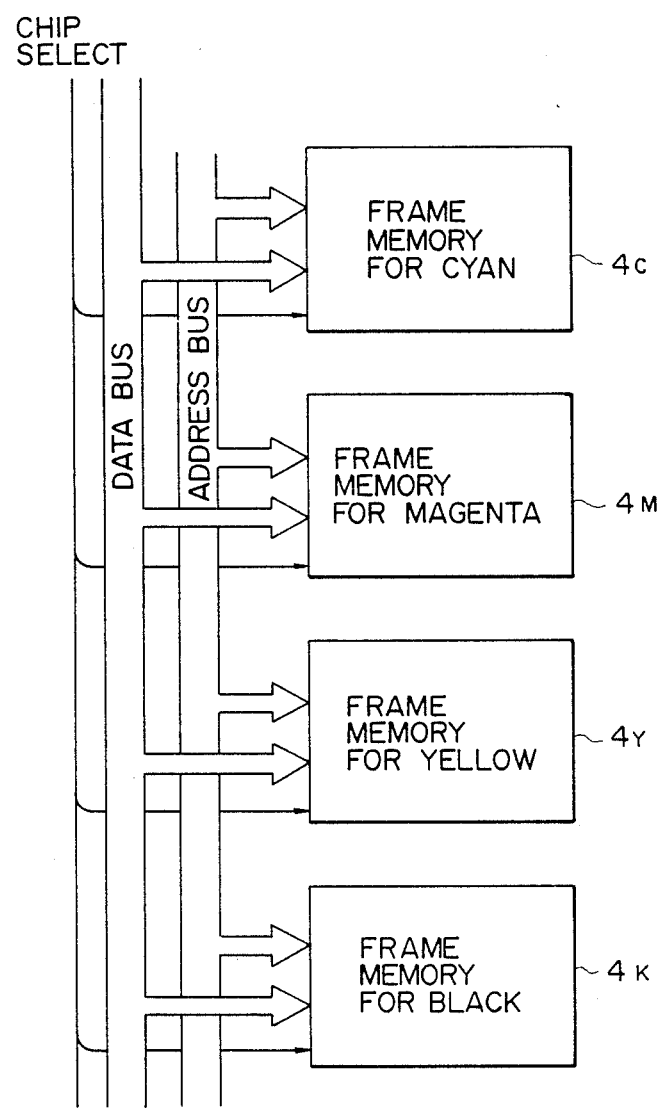
FIG. 2 is a schematic illustration showing one example of the schematic structure of a frame memory which may be provided in the system shown in FIG. 1.

As shown in FIG. 2, the frame memory 4 typically includes a cyan frame memory 4C having the capacity to store one page of image data for cyan (C), a magenta frame memory 4M having the capacity to store one page of image data for magenta (M); a yellow frame memory 4Y having the capacity to store one page of image data for yellow (Y), and a black frame memory 4K having the capacity to store one page of image data for black (K). Thus, the frame memory 4 includes four sets of frame memories 4C, 4M, 4Y and 4K for four different coloring materials, i.e., cyan, magenta, yellow and black.

Figure 3:
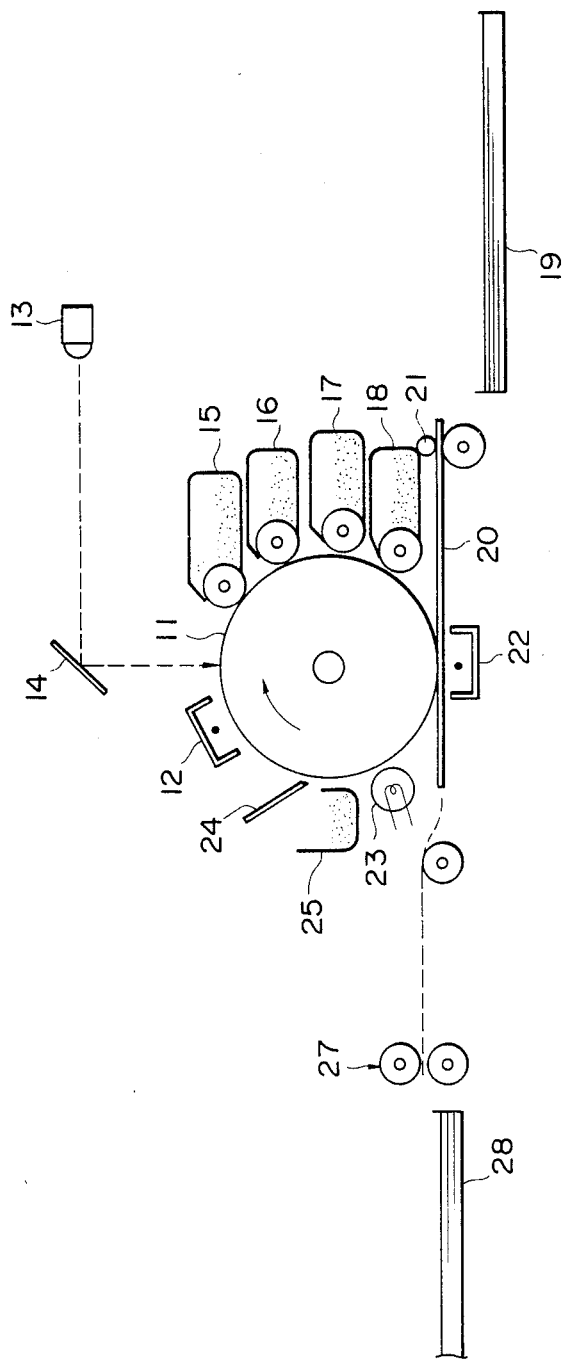
FIG. 3 is a schematic illustration showing the overall mechanical structure of a color printer (print engine)

FIG. 3 schematically illustrates a printer engine or image forming unit for printing a color image on a sheet of paper in accordance with color image information supplied from the color image processing system shown in FIG. 1. The illustrated printer engine includes a photosensitive drum 11 which is driven to rotate in the direction indicated by the arrow at constant speed. While the drum 11 rotates, its peripheral or imaging surface is first charged to a predetermined polarity uniformly, and, then, the uniform charge is exposed to a light image applied from a laser diode 13, to which image data of each color component is applied one after another, through reflection at a mirror 14. Thus, the uniform charge is selectively dissipated to form an electrostatic latent image on the drum 11 in accordance with the image data of one of the four color component images. Then, the thus formed latent image is developed by a corresponding one of four developing units, including a cyan toner developing unit 15, a magenta toner developing unit 16, a yellow toner developing unit 17 and a black toner developing unit 18.

On the other hand, the topmost sheet 20 of a stack of recording paper stored in a paper cassette 19 is fed forwardly by a paper feeding roller 21, so that the sheet of paper 20 is supplied to an image transfer station at a predetermined timing in association with the rotation of the drum 11. Then, a high voltage is applied to an image transferring corona unit 22 at a predetermined timing, so that the developed toner image on the drum 11 is transferred to the sheet of paper 20 as it travels through the image transfer station. Then, the residual charge remaining on the drum 11 is dissipated by a quenching lamp 23, and, then, the residual toner remaining on the drum 11 is also removed by a cleaning brush 24. The thus removed toner is then collected into a toner collection battle 25. As a result, the drum 11 is set ready for the next cycle of an image forming process. On the other hand, the sheet of paper 20 is returned to a predetermined start position to be set ready for printing of a next color component image. Alternatively, there may be provided a loop path for the sheet of paper 20 to return to its predetermined start position.

Thereafter, the image data of another color component image is supplied to the laser diode 13 to form an electrostatic latent image on the drum 11. The latent image is then developed with toner of another color, so that a developed toner image of another color component is formed on the drum 11, which is then transferred to the sheet of paper 20 as superimposed on the transferred toner image of first color component image. By repeating the above-described steps for the remaining color component images, there can be obtained a color image printed on the sheet of paper 20 with four colors, i.e., cyan, magenta, yellow and black. The sheet of paper 20 is then transported past an image fixing unit 27 to have the transferred imaged permanently fixed to the sheet of paper 20, and, then, the sheet of paper 20 is discharged onto a tray 28.

Figure 4B:
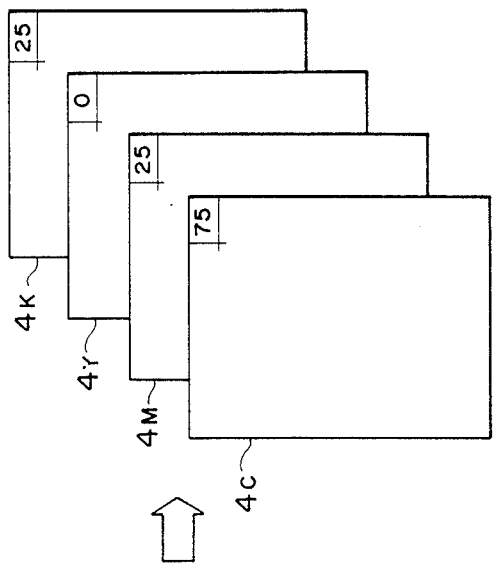
FIGS. 4a and 4b are schematic illustrations which are useful for explaining an UCR process.
Figure 4A:
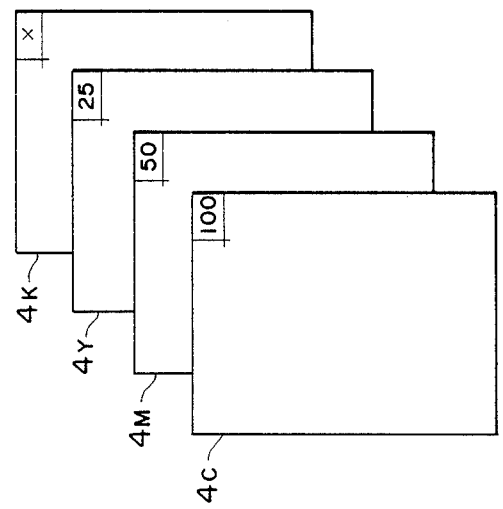
Figure 7:
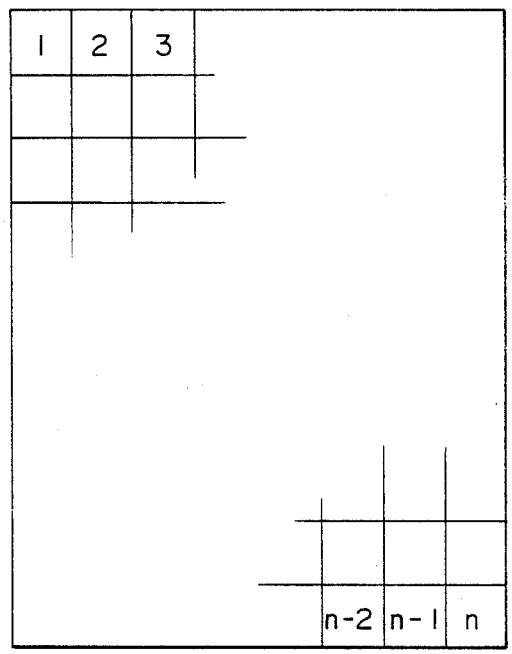

Referring now to FIGS. 4a and 4b, an UCR function in the above-described printer will be described. The UCR function is a function to create print data for black (K) based on cyan (C), magenta (M) and yellow (Y) print data, which have been received from a host system or which have been obtained by converting image data for red (R), green (G) and blue (B) color image components received from the host system. For example, with a frame memory structure shown in FIG. 2, if one dot of each frame memory has eight bits, whereby 256 different tones may be represented, and the tone data of one dot corresponding to one pixel of each of cyan, magenta and yellow frame memories, i.e., 4C, 4M and 4Y, has a value of 100, 50 and 25 as shown in FIG. 4a, since black has a mixture value of the three colors, in the case of 100% UCR, the minimum value among the data of cyan, magenta and yellow (in the illustrated example "25" of yellow) must be subtracted from each data of cyan, magenta and yellow to create print data for cyan, magnta and yellow. And, the data for black is set as the minimum value among the data for cyan, magenta and yellow. As a result, print data for cyan, magenta, yellow and black can be obtained in the following manner.

cyan: 100−25=75
magenta: 50−25=25
yellow: 25−25=0
black: minimum =25

Therefore, the image data for cyan, magenta and yellow as received from the host system are first stored in respective frame memories 4C, 4M and 4Y as shown in FIG. 4a (in this instance, the data for frame memory 4K is indefinite, and, thus, indicated by X). Then, the UCR calculation is carried out as described above to obtain print data for cyan, magenta, yellow and black, which are stored in the respective frame memories 4C, 4M, 4Y and 4K as shown in FIG. 4b.

Referring now to FIGS. 5(I) and 5(II), there is shown a color image processing system which allows to selectively set its UCR function to be operative or inoperative. As shown, there is provided a controller 31 for controlling various operations, such as writing and reading of data to and from frame memories 4C, 4M, 4Y and 4K, UCR processing and transfer of data for the associated printer engine. The controller 31 supplies C, M, Y and K count pulses to respective cyan counter (C counter) 32C, magenta counter (M counter) 32M, yellow counter (Y counter) 32Y and black counter (K counter) 32K, which produce address and read/write signals for controlling writing and reading of data into and from the associated frame memories 4C, 4M, 4Y and 4K. The controller 31 also outputs a count clear signal for clearing the count in each of these counters. The C counter 32C, M counter 32M, Y counter 32Y and K counter 32K count C, M, Y and K count pulses, respectively, from the controller 31 and supply address data and read/write data to respective frame memories 4C, 4M, 4Y and 4K. When these counters have reached the count-up condition, they supply count-up signals to associated flip-flops 33C, 33M, 33Y and 33K, respectively. When these flip-flops 33C, 33M, 33Y and 33K are set by the count-up signals from the respective counters 32C, 32M, 32Y and 32K, they supply a count-up signal to the controller 31 through an OR circuit 34.

In order to control the UCR process and data transfer to the printer engine, the controller 31 outputs a multiplexer enable gate signal to a multiplexer 35 for switching the operation between a data transfer mode for transferring data to the associated printer engine and an internal processing mode for processing data internally. Also output from the controller 31 is a code/frame memory data switching signal which indicates the data to be transferred to the associated printer engine is either code data or frame memory data. In addition, the controller 31 outputs code/frame memory input data to the multiplexer 35 and also to each of the frame memories 4C, 4M, 4Y and 4K. On the other hand, the frame memory data output read out of each of the frame memories 4C, 4M and 4Y is input into the controller 31. In addition, a printer ready signal, supplied from the associated printer engine, for determining whether or not data transfer to the associated printer engine is possible is also input into the controller 31. Incidentally, this printer ready signal is set in a busy status when the associated printer engine cannot receive print data, for example, because it is in operation, and it is set in a ready status if the associated printer engine can receive print data. The multiplexer 35 switches between a transfer mode for transferring the frame memory data read out of each of the frame memories 4C, 4M, 4Y and 4K to the associated printer engine and an input mode for inputting data into the controller 31 in accordance with a multiplexer enable gate signal supplied from the controller 31. In addition, the multiplexer 35 allows to pass such signals as code/frame memory data switching signal, code input data and strobe signal, which are supplied from the controller 31, to the associated printer engined.

In operation, in the first place, the controller 31 causes the multiplexer 35 to be inhibited in accordance with the multiplexer enable gate signal, during which image data for each of cyan, magenta and yellow received from the host system are stored into the cyan, magenta and yellow frame memories 4C, 4M and 4Y, respectively, in accordance with address data and a write signal supplied from each of C, M and Y counters 32C, 32M and 32Y responsive to C, M and Y count pulses. And, after storing the received image data for one page on each of the cyan, magenta and yellow frame memories 4C, 4M and 4Y, upon receipt of a print start command, it is first checked the status which indicates whether the internal UCR is to be executed or not executed, thereby determining whether or not the UCR process is to be carried out for the image data thus received in the respective frame memories. If the UCR execute/not execute status indicates a set condition when checked, the UCR process is carried out prior to start of printing (or prior to transfer of data to the associated printer engine).

In accordance with this UCR process, the controller 31 first causes the multiplexer 35 to be inhibited in accordance with the multiplexer enable gate signal, thereby establishing a condition which allows the data read out of the frame memories 4C, 4M and 4Y to be input therein. At the same time, the controller 31 outputs a counter clear pulse to clear each of the C, M, Y and K counters 32C, 32M, 32Y and 32K. Thereafter, the controller 31 supplies C count pulse to the C counter 32C, so that C counter 32C outputs an address data and a read signal to the cyan frame memory 4C, thereby reading out the data at an address designated by the address data and causing this data to be input into the controller 31. Then, M count pulse is output from the controller 31 to the M counter 32M, so that M counter 32M outputs an address data and a read signal to the magenta frame memory 4M, thereby causing the data at an address designated by the address data to be read out and input into the controller 31. And, then, Y count pulse is output from the controller 31 to the Y counter 32Y, so that the Y counter 32Y outputs an address data and a read signal to the yellow frame memory 4Y, thereby causing the data (tone data) at an address designated by the address data to be read out and input into the controller 31. In this manner, the controller 31 controls to read out the data from each of the cyan, magenta and yellow frame memories 4C, 4M and 4Y one after another and then causes the data thus read to be input into the controller 31.

Under the condition, the controller 31 determines the minimum-valued data among the three data of cyan, magenta and yellow thus input therein, and, then, implements the following calculation, i.e., UCR processing, to thereby modify the data to form print data for cyan, magenta and yellow.

cyan data−minimum data=new cyan data
magenta data−minimum data=new magenta data yellow data−minimum data=new yellow data Then, the controller 31 causes the C counter 32C to output the same address data as the previous address data and also a write signal in accordance with a C count pulse, thereby causing the new cyan data which has been obtained by implementing the UCR processing to be written into the same address, from which the old cyan data has been read out, as a print data for cyan. Similarly, the controller 31 causes the M counter 32M to output the same address data as the previous address data and also a write signal in accordance with an M count pulse, thereby causing the new magenta data which has been obtained by implementing the UCR processing to be written into the same address, from which the old magenta data has been read out, as a print data for magenta. Moreover, the controller 31 causes the Y counter 32Y to output the same address data as the previous address data and also a write signal in accordance with a Y count pulse, thereby causing the new yellow data which has been obtained by implementing the UCR processing to be written into the same address, from which the old yellow data has been read out, as a print data for yellow. Finally, in accordance with a K count pulse, the controller 31 causes the K counter 32K to output the same address data as the above-mentioned read address data and also a write signal, thereby causing the minimum data which has been determined during the UCR processing to be written into the black frame memory 4K as a print data for black. In this manner, the UCR processing for the data of one dot or pixel is completed.

By repeating the above-described operation for each of the addresses for each of frame memories 4C, 4M, 4Y and 4K until the final address is reached, the UCR processing is applied to all of the data for one page. Thus, upon completion of the UCR processing, the frame memories 4C, 4M, 4Y and 4K store print data for one page. Accordingly, upon completion of the UCR processing, the controller 31 controls to read out the print data from each of the frame memories 4C, 4M, 4Y and 4K in a predetermined order of printing color image components and to transfer the data to the associated printer engine. It is to be noted that such a color print order may be fixed or selectively determined appropriately, for example, by switches or instructions from the host system. That is, upon completion of the UCR processing, the controller 31 causes the multiplexer 35 to be released from its inhibited state in accordance with the multiplexer enable gate signal, thereby establishing the state which allows the data read out of the frame memories 4C, 4M, 4Y and 4K and a code data from the controller 31 to be transferred to the associated printer engine.

Under the condition, if the color print order is set as cyan, magenta, yellow and black in the order mentioned, the controller 31 in the first place checks the printer ready signal from the printer engine, and, if it has been found to be in the ready status, the code/frame memory data switching signal is set at "H" to thereby indicate transfer of code, and, thereafter, as shown in FIG. 6, an ESC code, which constitutes a color designation code, is transferred to the associated printer engine. And, then, when the printer ready signal has changed from its busy status to its ready status, "C" code, which indicates a cyan color designation code, is transferred to the printer engine to apprise the printer engine of the fact that the cyan data will be transferred. Then, the controller 31 changes the status of the code/frame memory data switching signal to "L", which indicates the fact that the data to be transferred is the data (tone data) of a frame memory. Thereafter, the controller 31 causes the C counter 32C to output an address data and a read signal in accordance with a C count pulse, thereby causing the data to be read out of each address of the cyan frame memory 4C and then transferred to the associated printer engine. This operation is repeated as many times as required so that all of the tone data from the first address to the nth address (final address) of the cyan frame memory 4C are transferred to the associated printer engine one after another in sequence.

When the C counter 32C has reached the count corresponding to the final address of the cyan frame memory 4C, the C counter 32C outputs a count-up signal which causes the flip-flop 33C to be set, so that the count-up signal is input into the controller 31 through the OR circuit 34. Upon receipt of this count-up signal, the controller 31 causes the code/frame memory data switching signal to be switched to its code status, and, then, the controller 31 supplies an end code and then triggers a count clear signal to thereby cause the C counter 32C to be cleared.

And, then, similarly, after outputting a color designating code for magenta, all of the data in the magenta frame memory 4M are transferred using the M counter 32M, and, upon receipt of a count up signal from the flip-flop 33M which is set when the M counter 32M has counted up, an end code is supplied. In succession, similarly, a color designating code for yellow is output, and, then, all of the data in the yellow frame memory 4Y are transferred using the Y counter 32Y. Then, upon receipt of a count up signal from the flip-flop 33Y which is set when the Y counter 32Y has counted up, an end code is supplied. Moreover, in a similar manner, after outputting a color designation code for black, the data in each address of the black frame memory 4K is transferred using the K counter 32K. And, upon receipt of a count up signal from the flip-flop 33K which is set when the K counter 32K has counted up, an end code is transferred. In this manner, the data of the frame memories 4C, 4M, 4Y and 4K are transferred to the associated printer engine in a predetermined order of color components, e.g., cyan, magenta, yellow and black, so that all of the data of each of the color components for one page can be transferred.

On the other hand, if the UCR execute/not execute status is in its off status to thereby indicate that no UCR process is to be carried out when the controller 31 has received a print start command, the data in the three frame memories for cyan, magenta and yellow, i.e., 4C, 4M and 4Y, are immediately transferred to the associated printer engine one after another in sequence without setting data in the black frame memory 4K through the UCR processing. In this manner, in the above-described structure, the internal status indicating whether or not the UCR processing is to be carried out is checked prior to print start, and the UCR processing is carried out only when the internal status indicates so. Thus, the user can obtain a color image having a desired color contrast or characteristic. In other words, by applying the UCR processing, an image with shades can be obtained depending on the characteristic of an image to be formed. However, there is a case in which the application of the UCR processing darkens a resulting image. Under the circumstances, in accordance with this aspect of the present invention which allows to apply the UCR processing selectively, there can be obtained an image having a desired color contrast. In addition, since black toner is not consumed when the UCR processing is not carried out, the amount of consumption of toner can be minimized.

Various means for selectively setting the UCR function to be either operative or inoperative may be provided. For example, a switch may be provided in the color printer for setting the internal status of UCR execute/not execute signal to be either in a set condition or in a reset condition. Alternatively, it may also be so structured that a predetermined particular code is supplied from the host system to the present color printer for controlling the status of UCR process. As shown in FIG. 8, in one example, a switch 41 is connected between a power supply voltage and ground and a node a, where an ON/OFF signal of the switch 41 is generated, is connected to a set terminal S of a S-R type flip-flop 43 which has a reset terminal R which is connected from node a through an inverter 42. A power on reset signal is coupled to a clear terminal CLR of the flip-flop 43. And, an output from O terminal of the flip-flop 43 defines an UCR execute/not execute signal. Thus, the flip-flop 43 constitutes a status flip-flop which controls the status of the UCR status signal in accordance with the ON/OFF status of the switch 41. With this structure, when the switch 41 is turned on, the status flip-flop circuit 43 is reset, so that the O output signal of UCR execute/not execute signal is set to be "0", thereby designating the UCR not execute status. On the other hand, when the switch 41 is turned off, the status flip-flop circuit 43 is set, so that the O output of UCR execute/not execute signal is set to be "1", thereby designating the UCR execute status.

Alternatively, as shown in FIG. 9, there may be provided a code interpreter 45 for interpreting a particular code which indicates whether the UCR process is to be executed or not and which is supplied from the host system. A status flip-flop 46 is provided as connected to the code interpreter 45, and the status flip-flop 46 is either set or reset in accordance with a code detection signal supplied from the code interpreter 45 and supplies the UCR execute/not execute signal as its O output. With this structure, when a predetermined particular code, which indicates whether or not the UCR process is to be carried out, has been supplied from the host system, the code is detected and interpreted by the code interpreter 45 to thereby cause the status flip-flop 46 to be set or reset appropriately. Therefore, the status flip-flop 46 supplies the UCR execute/not execute signal having either "1" or "0" as its O output. Thus, it is determined whether the UCR process is to be carried out or not depending on the state of the UCR execute/not execute status signal.

Now, referring to FIGS. 5(I) and 5(II) and also to FIG. 10, it will be described a color image processing system with an adjustable UCR rate, which may be preferably incorporated into the controller 31 shown in FIGS. 5(I) and 5(II). In the following description, it will be assumed that the UCR process is to be carried out. In the system shown in FIG. 10, a magnification selection switch 51 is a switch for selecting a desired UCR rate, which will also be referred to as "magnification". In the illustrated example, the switch includes six contacts which are pulled up to a power supply voltage +V and thus the UCR rate (magnification) can be set in six different levels, including 0%, 20%, 40%, 60%, 80% and 100%. Also provided is an UCR rate memory or magnification memory 52 which stores a particular UCR rate input from the switch 51. Also provided as a comparator 53 which compares the data of cyan, magenta and yellow to one another and detects the minimum-valued data (lowest level data) among the three data for the same address. The comparator 53 outputs the thus detected minimum-valued data as its output. A multiplier 54 receives the minimum-valued data from the comparator 53 and multiplies the magnification (UCR rate) from the magnification memory 53 to the minimum-valued data and outputs a multiplied result. Three subtractors 55C, 55M and 55Y are also provided for for subtracting the multiplied output from the multiplier 54 from the respective cyan, magenta and yellow data, and these subtractors 55C, 55M and 55Y output the respective subtracted results as cyan data, magenta data and yellow data.

In operation, as described previously, the controller 31 reads out and takes in the data of cyan, magenta and yellow from the respective frame memories 4C, 4M and 4Y prior to print start. The data of cyan, magenta and yellow of the same address are compared at the comparator 53 to determine a minimum-valued data which is then supplied to the multiplier 54. On the other hand, the magnification data (UCR rate data) having the information regarding the UCR rate selected by the switch 51 is stored into the magnification memory 52 inside of the controller 31, and this magnification data is supplied to the multiplier 54. Under this condition, the minimum-valued data supplied from the comparator 53 is multiplied by the magnification data supplied from the magnification memory 52 at the multiplier 54 which then supplies its multiplied output to each of the cyan, magenta and yellow subtractors 55C, 55M and 55Y. As a result, from the subtractors 55C, 55M and 55Y are output a cyan data, a magenta data and a yellow data, respectively, which are obtained by subtracting the multiplied output from the multiplier 54 from the cyan data, magenta data and yellow data read out of the respective frame memories 4C, 4M and 4Y. On the other hand, the multiplied output from the multiplier 54 is output as a black data as it is.

Then, under the control of the controller 31, these cyan, magenta, yellow and black data are written into the cyan, magenta, yellow and black frame memories 4C, 4M, 4Y and 4K, respectively, at the same address. In this manner, in accordance with this embodiment, the UCR processing can be carried out at a desired level by appropriately selecting a desired UCR rate using the UCR rate selection switch 51. For example, assuming that the cyan, magenta and yellow data originally have the values of 100, 50 and 25, respectively, as in the previously described example, if the UCR rate of 100% has been selected, the following data will be obtained as print data.

cyan: $100 - (25 \times 1.0) = 75$
magenta: $50 - (25 \times 1.0) = 25$
yellow: $25 - (25 \times 1.0) = 0$
black: minimum value $= 25$ On the other hand, if the UCR rate has been selected to be 80%, the following data will be obtained as print data.

cyan: $100 - (25 \times 0.8) = 80$
magenta: $50 - (25 \times 0.8) = 30$
yellow: $25 - (25 \times 0.8) = 5$
black: minimum value $\times 0.8 = 20$ In this manner, by suitably selecting a desired UCR rate, there can be obtained an image of desired quality, so that the operability and functionality as a printer is enhanced. That is, in the case when a pale image is desired to be printed in darker in image density, and if the UCR process is desired to be applied for a darker image so as to avoid the resulting image from being blackened, the UCR rate may be set at a lower level in order to obtain an image having a desired image characteristic. In addition, by setting the UCR rate somewhere between 100% and 0% and away from each of these two extremes, there can be obtained an image blackened in appearance but having shading. In the above-described embodiment, provision is made of the UCR rate selection switch 51; however, as an alternative structure, instead of or in combination with a switch, provision may be made of means for detecting a predetermined UCR rate setting code supplied from the host system, as described before.

Figure 11I:
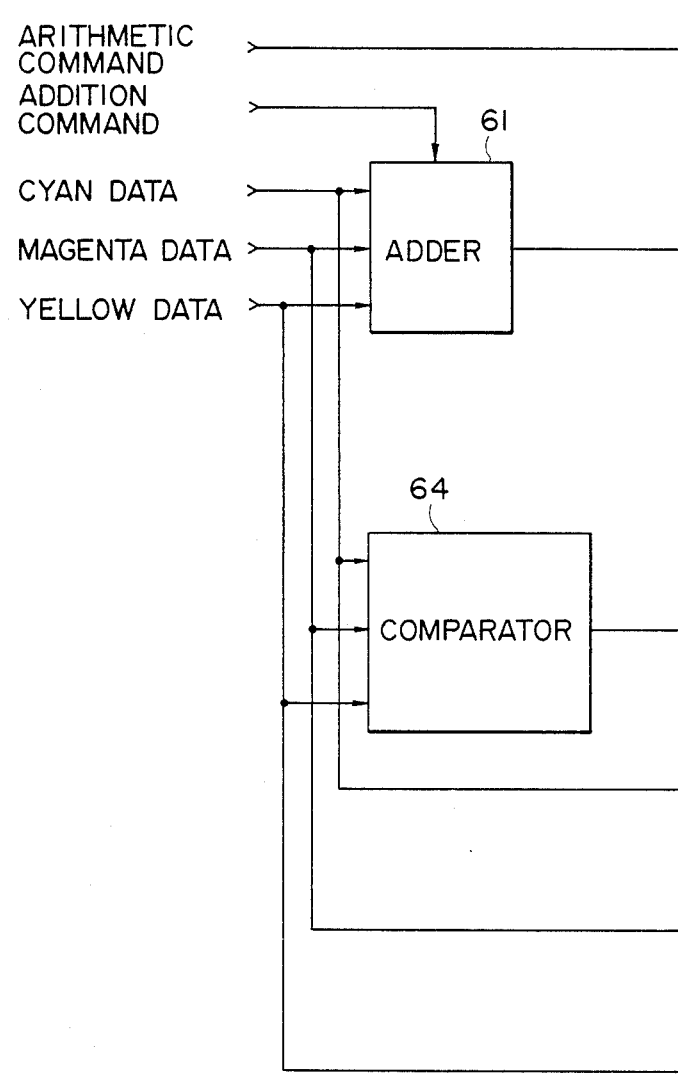
Figure 11:
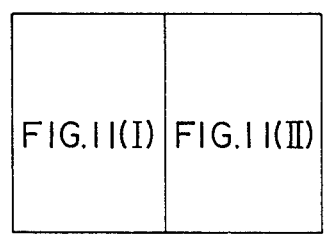
FIG. 11 is an illustration showing how to combine FIGS. 11(I) and 11(II)
Figure 11:
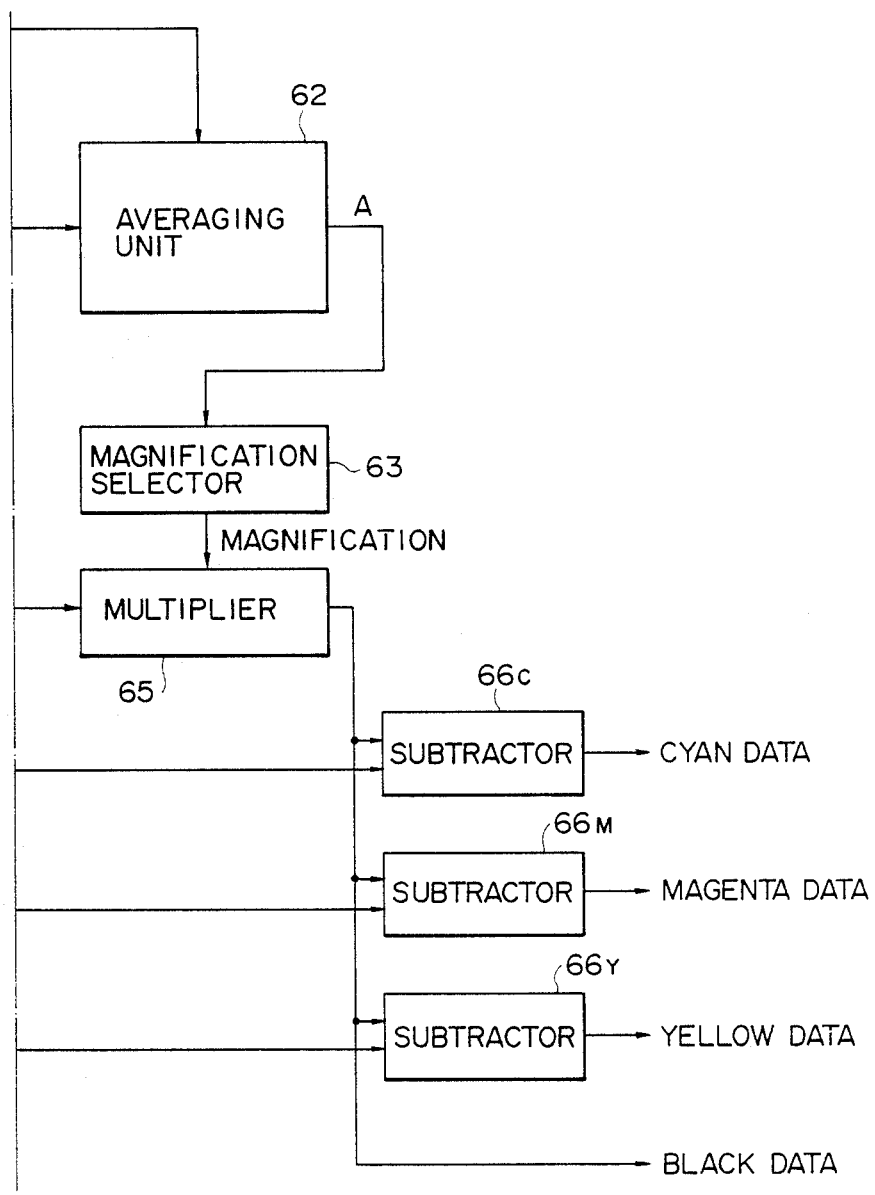

Now, referring particularly to FIGS. 11(I) and 11(II), a color image processing system having an automatically adjustable UCR function, which may be advantageously incorporated into the controller 31 shown in FIGS. 5(I) and 5(II), will be described. As shown in FIGS. 11(I) and 11(II), an adder 61 adds cyan, magenta and yellow data of a particular address each time when these data are input as read out of the respective frame memories 4C, 4M and 4Y. Thus, a read pulse for each of the frame memories 4C, 4M and 4Y is supplied to the adder 61 as an addition command. On the other hand, a frame data read end pulse is input into an averaging unit 62 as an arithmetic command. Accordingly, upon completion of read out of data at a particular address of each of the frame memories 4C, 4M and 4Y, the result of addition at the adder 61 is averaged at the averaging unit 62 to thereby output an averaged value A. Also provided is a magnification (UCR rate) selector 63 which received the averaged value A from the averaging unit 62 and outputs a corresponding magnification (UCR rate).

Also provided is a comparator 64 which receives cyan, magenta and yellow data at a particular address, compares these data, determines a minimum-valued (lowest level) data among the three and outputs the thus determined minimum-valued data. A multiplier 65 is provided for multiplying the minimum-valued data from the comparator 64 by the magnification (UCR rate) from the magnification selector 63, and the thus multiplied result is supplied as an output. The multiplied result is supplied to each of subtractors 66C, 66M and 66Y which subtract the multiplied result from the cyan, magenta and yellow data, respectively, and the thus subtracted results are output as cyan data, magenta data and yellow data, which constitute print data for cyan, magenta and yellow.

In operation, prior to print start, under the control of the controller 31, the data at each of predetermined addresses, which are indicated by circles in FIG. 12 as an example, is read from each of the frame memories 4C, 4M and 4Y one after another in sequence address by address. The thus read data is supplied into the controller 31 in a manner similar to that described in relation to the previous embodiment. Thus, the data of cyan, magenta and yellow read out of the respective frame memories 4C, 4M and 4Y at a particular address are input into the adder 61 one after another, so that the adder 61 adds these cyan, magenta and yellow data each time when the data is input as read out of the corresponding one of the frame memories 4C, 4M and 4Y at the same address. And, the added result is supplied to the averaging unit 62. Upon completion of read out of data from each of the frame memories 4C, 4M and 4Y at a particular address, the averaging unit 62 calculates an average of the added value supplied from the adder 61. In this case, since the density of black color corresponds to a mixture value of three colors, i.e., cyan, magenta and yellow, in the UCR process, an average of cyan, magenta and yellow data of all addresses indicates an average density of one page.

The averaged value A calculated at the averaging unit 62 is then supplied to the magnification selector 63 which selects a magnification (UCR rate) in accordance with the averaged value A thus supplied, and the selected magnification is supplied to the multiplier 65. A relation between averaged value A and magnification may, for example, be set as illustrated in FIG. 13 or 14. Thus, the selected magnification is now set in the multiplier 65. Thereafter, the controller 31 causes cyan, magenta and yellow data of one pixel, i.e., at the same address, to be read out of the respective frame memories 4C, 4M and 4Y for execution of UCR processing while renewing the address. The cyan, magenta and yellow data thus read out are compared to one another by the internal comparator 64 to thereby determine which data is a minimum-valued data, which is then supplied to the multiplier 65. Accordingly, at the multiplier 65, the minimum-valued data supplied from the comparator 64 is multiplied by the magnification data supplied from the magnification selector 63 and the result of multiplication is supplied to each of the subtractors 66C, 66M and 66Y.

Therefore, at the subtractors 66C, 66M and 66Y, the multiplied output from the multiplier 65 is subtracted from each of the cyan, magenta and yellow data supplied as read out of the respective frame memories 4C, 4M and 4Y and the subtracted values are output as cyan data, magenta data and yellow data. On the other hand, the multiplied output from the multiplier 65 is output directly as a black data. The controller 31 causes these new cyan data, magenta data, yellow data and black data to be stored into the respective frame memories 4C, 4M and 4Y and 4K, respectively, at the same address. In this manner, in accordance with this embodiment, the density (tone) of image data is determined and the magnification (UCR rate) is automatically determined based on the density.

Figure 15I:
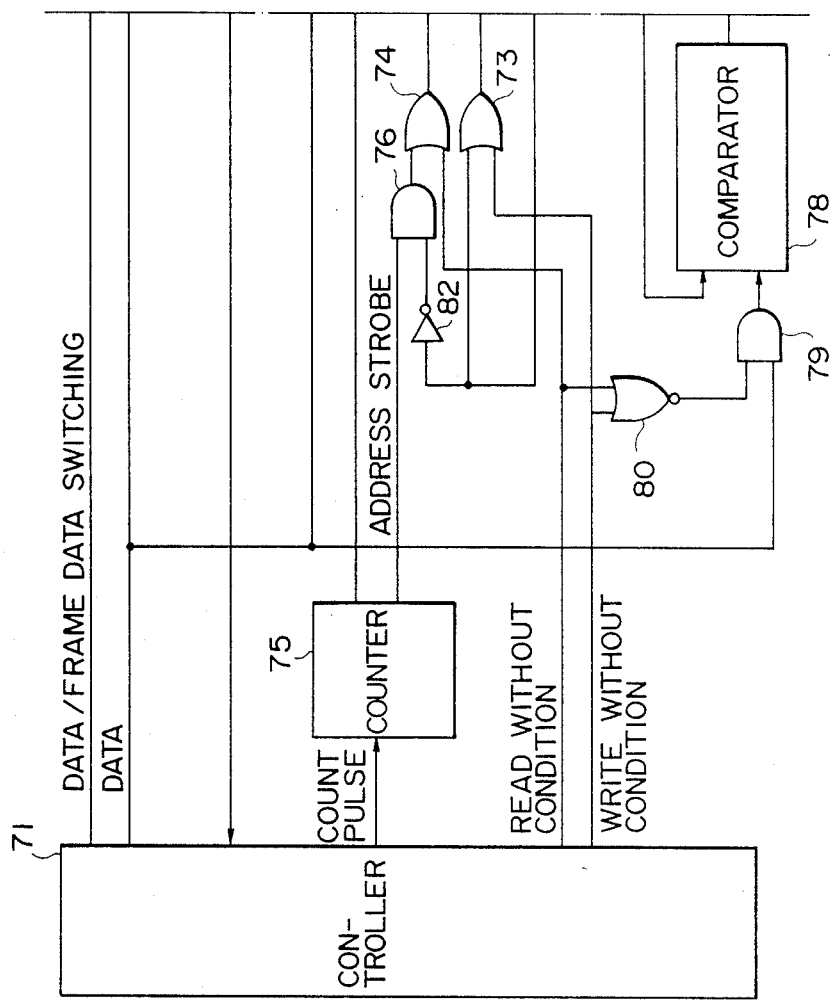
Figure 15:
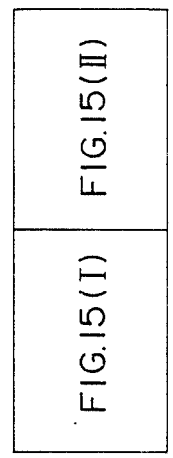
FIG. 15 is an illustration showing how to combine FIGS. 15(I) and 15(II)

Referring now to FIGS. 15(I) and 15(II), there is shown a color image processing system having an UCR function in which black color is printed after printing other color component images constructed in accordance with a still further embodiment of the present invention. As shown, there is provided a controller 71 which takes care of various controls, including a read and write control of data from and to a black frame memory 72 and a transfer control of data to an associated printer engine. It is to be noted that in the present embodiment only the black frame memory 72 is provided as a frame memory as compared with four frame memories in the previous embodiments.

In order to control writing and reading of data into and from the frame memory 72, the controller 71 outputs an unconditioned write signal to an OR circuit 73 and an unconditioned read signal to an OR circuit 74. In addition, the controller 71 outputs a count pulse to a counter 75 so as to designate an address of the frame memory 72. The counter 75 counts a count pulse supplied from the controller 71 and outputs an address data directly to the frame memory 72 while outputting an address strobe signal to an AND circuit 76 and an OR circuit 74 as a read signal. In addition, the controller 71 transfers the data received from the host system through a multiplexer 77 and outputs a data/frame data switching signal to the multiplexer 77 for switching between transfer of data from the controller 71 and transfer of frame memory data read out of the frame memory 72. The data from the controller 71 is also supplied to the frame memory 72.

Also provided is a comparator 78 which compares a data, which is to be transferred to the associated printer engine from the controller 71 and which is input through an AND circuit 79, with a data read out of the frame memory 72. The comparator 78 outputs a write signal if the data to be transferred to the associated printer engine is smaller than the frame memory data. The open/closed status of the AND circuit 79 is controlled by an output from a gate circuit 80 which receives an unconditioned write signal and an unconditioned read signal from the controller 71. Also provided is a delay circuit 81 which causes a write signal from the comparator 78 to be delayed, and the delayed write signal is then supplied to the frame memory 72 through the OR circuit 73 and also to the AND circuit 76 through an inverter 82, thereby inhibiting address strobe during writing mode.

In operation, in the first place, the controller 71 supplies the unconditioned write signal to the black frame memory 72 and set the multiplexer 77 in an inhibited status by the data/frame data switching signal. Thereafter, the controller 71 outputs the count pulse to the address data generating counter 75. Under the condition, while renewing the address, the controller 71 outputs the maximum tone data which is thus stored into the frame memory 72 at each address. Then, when the controller 71 has received an input data, it checks the status of the print ready signal. And, while controlling the multiplexer 77 by the data/frame data switching signal, a color designation code, tone data of received one page, and an end code are transferred to the associated printer engine in the order mentioned one after another.

In this case, the controller 71 outputs a count pulse in synchronism with transfer of received tone data, so that an address data having the same address as that of the tone data to be transferred and an address strobe signal are output from the counter 75. At this time, since the AND circuit 76 is in its closed state, the address strobe signal is supplied to the frame memory 72 through the OR circuit 74 as a read signal. As a result, from the frame memory 72 is read out a data from the same address as that of the tone data to be transmitted in synchronism with transfer of the toner data. And, the data thus read out of the frame memory 72 is input into the comparator 78. Under the condition, since the unconditioned write and read signals are not output from the controller 71, the AND circuit 79 is set in its open state in accordance with an output from the gate circuit 80, so that the data transferred from the controller 71 is input into the comparator 78 through the AND circuit 79.

Under the circumstances, the comparator 78 compares the transfer data (received data) supplied from the controller 71 with the read out data supplied from the frame memory 72 and outputs a write signal if the transfer data is smaller than the read out data from the frame memory 72. This write signal is delayed by the delay circuit 81 and then supplied to the frame memory 72 as a write signal through the OR circuit 73; on the other hand, this write signal is supplied to the AND circuit 76 through the inverter 82 to thereby inhibit the address strobe signal (read signal). As a result, if the transfer data is smaller than the read out data from the frame memory 72, the transfer data is stored into the frame memory at a corresponding address. In this manner, after transferring each of received data of cyan, magenta and yellow to the associate printer engine, the minimum-valued data among cyan, magenta and yellow data of the same address is stored into the frame memory 72 at each address.

Upon completion of transfer of data of three colors, i.e., cyan, magenta and yellow, the controller 71 causes the black data to be read out of the frame memory 72 using the unconditioned read signal while renewing the address in accordance with the count pulse, and the thus read out black data from the frame memory 72 is then transferred to the associated printer engine through the multiplexer. In this manner, in accordance with the present embodiment, three color component images of cyan, magenta and yellow are first printed and then black image component is printed as superimposed on the previously printed cyan, magenta and yellow color component images.

In the above-described embodiment, the minimum value among the three color (cyan, magenta and yellow) data is determined as a black data; however, this black data may be increased or decreased as desired so as to make the resulting image more lighter or darker in black. In addition, in the above-described embodiment, the maximum value of tone data is stored into the frame memory 72 as default value; however, it may also be so structured to store the minimum value of tone data as a default value. In the above-described embodiment, since black data can be created while printing three color (cyan, magenta and yellow) data, so that the UCR processing can be carried out at high speed. In addition, in the above-described embodiment, only one frame memory is required so that the structure may be simplified significantly. It should also be noted that the present invention has been described mainly for applications to printers; however, the present invention may also be applied to color display devices.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A color image processing system having an UCR function, comprising:
   first storing means for storing data of three different color component images, each in a predetermined format;
   second storing means for storing data of a black component image in said predetermined format;
   controlling means operatively connected to a host system and also to an output apparatus for controlling said first and second storing means, said controlling means causing data of three different color component images received from said host system to be stored into said first storing means, finding a minimum data among said three data at each address, storing said minimum data in said second storing means in a corresponding address, and renewing each of said data stored in said first storing means by subtracting said minimum data of a corresponding address from each of said data at the corresponding address; and mode setting means operatively coupled to said controlling means for selectively setting a UCR function of said controlling means to be operative or inoperative.

2. The system of claim 1, wherein said mode setting means includes a switch which may be set open or closed to set said UCR function to be either operative or inoperative depending on a state of said switch.

3. The system of claim 2, wherein said switch is a manually operable switch.

4. The system of claim 2, wherein said mode setting means further includes a flip-flop operatively coupled to said switch and also to said controlling means.

5. The system of claim 1, wherein said mode setting means includes a code interpreter for receiving a data supplied from said host system, said code interpreter supplying a mode signal to said controlling means upon receipt of a predetermined code supplied from said host system, whereby said UCR function is set either operative or inoperative depending on a status of said mode signal.

6. A color image processing system having an UCR function, comprising:

first storing means for storing data of three different color component images, each in a predetermined format;

second storing means for storing data of a black component image in said predetermined format;

controlling means operatively connected to a host system and also to an output apparatus for controlling said first and second storing means, said controlling means causing data of three different color component images received from said host system to be stored into said first storing means, finding a minimum data among said three data at each address, storing said minimum data in said second storing means in a corresponding address, and renewing each of said data stored in said first storing means by subtracting said minimum data of a corresponding address from each of said data at the corresponding address; and setting means for setting an UCR rate which is multiplied to said minimum data upon finding to thereby modify said minimum data.

7. The system of claim 6, wherein said setting means includes a switch for selectively determining said UCR rate at a desired level.

8. The system of claim 6, wherein said setting means includes averaging means for calculating an average of said three data of three different color component images at each address and selecting means for selecting said UCR rate in accordance with said calculated average in accordance with a predetermined manner.

9. A color image processing system having an UCR function, comprising:

storing means for storing data of one page of image in a predetermined format;

comparing means for comparing a new data supplied thereto from a host system with an old data stored in said storing means in a corresponding address, said comparing means causing one of said new and old data, which is smaller in value, to be stored into said storing means at the corresponding address; and controlling means operatively connected to said host system and also to an output apparatus for controlling storing means and said comparing means, said controlling means causing three data of three different color component images for each address received from said host system to be transferred to said output apparatus through said comparing means one after another, said controlling means causing said data stored in said storing means to be transferred to said output apparatus after transferring said three data of three different color component images to said output apparatus.

10. The system of claim 9, wherein said storing means includes a frame memory, said data remaining in said storing means after transferring said three data of three different color component images defining data of a black component image to be superimposed on said three color component images.

11. The system of claim 10, wherein said three different color component images include cyan, magenta and yellow images.

12. The system of claim 9, wherein said output apparatus is a color printer provided with a plurality of developing devices with different color toner.

* * * * *